United States Patent [19]

Sato et al.

[11] Patent Number: 4,717,314
[45] Date of Patent: Jan. 5, 1988

[54] SCROLL COMPRESSOR WITH CONTROL DEVICE FOR VARIABLE DISPLACEMENT MECHANISM

[75] Inventors: Tadashi Sato; Atsushi Mabe; Kiyoshi Terauchi, all of Gunma, Japan

[73] Assignee: Sanden Corporation, Gunma, Japan

[21] Appl. No.: 895,494

[22] Filed: Aug. 11, 1986

[30] Foreign Application Priority Data

Aug. 10, 1985 [JP] Japan .................................. 60-174968
Sep. 4, 1985 [JP] Japan .................................. 60-134406

[51] Int. Cl.$^4$ ............................................ E04B 49/00
[52] U.S. Cl. ...................................... 417/310; 62/196.3
[58] Field of Search .................... 418/55; 417/440, 310; 62/196.3

[56] References Cited

U.S. PATENT DOCUMENTS

| | | | |
|---|---|---|---|
| 4,468,178 | 8/1984 | Hiraga et al. | 417/440 |
| 4,496,296 | 1/1985 | Arai et al. | 417/440 |
| 4,497,615 | 2/1985 | Griffith | 417/440 |
| 4,505,651 | 3/1985 | Terauchi et al. | 417/440 |
| 4,514,150 | 4/1985 | Hiraga et al. | 417/440 |

FOREIGN PATENT DOCUMENTS 119092 7/1984 Japan .................................. 417/440

*Primary Examiner*—William L. Freeh
*Attorney, Agent, or Firm*—Banner, Birch, McKie & Beckett

[57] ABSTRACT

A scroll type compressor with a variable displacement mechanism is disclosed. The compressor includes a housing having fluid inlet and outlet ports. A fixed scroll is fixed within the housing and has a circular end plate from which a first spiral element extends. The end plate of fixed scroll partitions the inner chamber of housing into a front chamber, which includes a suction chamber connected to the fluid inlet port, and a rear chamber. The rear chamber is divided into a discharge chamber connected to the fluid outlet port and an intermediate pressure chamber. The end plate of the fixed scroll has at least two holes which connect the fluid pockets to the intermediate pressure chamber. A control device controls communication between the suction chamber and the intermediate pressure chamber and includes communicating mechanism. The communicating mechanism leaks compressed fluid in the cylinder at an increased rate into the suction chamber after the cylinder has moved upward a predetermined distance in order to effect stable operation of the displacement varying mechanism.

5 Claims, 11 Drawing Figures

SCROLL COMPRESSOR WITH CONTROL DEVICE FOR VARIABLE DISPLACEMENT MECHANISM

TECHNICAL FIELD

The present invention relates to a scroll type compressor, and more particularly, to a scroll type compressor with an improved control device for a variable displacement mechanism.

BACKGROUND OF THE INVENTION

When the air conditioning load in the compartment of a car is decreased by an air conditioning system, or the temperature in the compartment of a car is below the predetermined temperature, the displacement of a compressor for an air conditioning system is generally too large, so that the compression ratio of the compressor can be decreased.

A scroll type compressor which can vary the compression ratio is well known, for example, U.S. Pat. No. 4,505,651 and commonly assigned copending application Ser. No. 669,389 filed on Nov. 8, 1984 show a scroll type compressor with a variable displacement mechanism.

However, in U.S. Pat. No. 4,505,651, the change of the compression ratio is not sufficient. Also, in the mechanism shown in U.S. patent application Ser. No. 669,389, the temperature of discharge fluid increases abnormally when the compressor operates at high speed.

One resolution to above problems is disclosed in commonly assigned copending U.S. patent application Ser. No. 875,561 filed on June 18, 1986.

Referring to FIG. 1 herein, a control mechanism 1 for a variable displacement mechanism as disclosed in U.S. patent application Ser. No. 875,561 is illustrated. Control mechanism 1 for varying the displacement of a compressor includes cylinder 2, piston 3 which is slidably disposed in cylinder 2 and spring 4 which is disposed between the bottom portion of cylinder 2 and piston 3. When electromagnetic valve 5 is energized, compressed gas in a discharge chamber (not shown) is introduced into the top of cylinder 2 through a capillary tube (not shown). Since the pressue of compressed gas is larger than the recoil strength of spring 4 and the pressure in intermediate pressure chamber 6, piston 3 is urged downward, and closes the opening from cylinder 2 to intermediate pressure chamber 6. Accordingly, the compression ratio of the compressor is increased.

On the other hand, when electromagnetic valve 5 is de-energized, compressed gas is not supplied to cylinder 2. Thus, the pressure in cylinder 2 becomes less than the recoil strength of spring 4 and the pressure in intermediate pressure chamber 6, piston 3 is urged upward, and intermediate pressure chamber 6 communicates with communicating chamber 7 through cylinder 2. Accordingly, refrigerant gas in intermediate pressure chamber 6 flows into communicating chamber 7 through cylinder 2. In this manner the volume of compressed gas which discharges into the discharge chamber is decreased, and the compression ratio of the compressor is decreased.

In a scroll type compressor with the abovementioned variable displacement mechanism, if electromagnetic valve 5 closes the communication between cylinder 2 and the discharge chamber in order to change the compression ratio from maximum to minimum, high pressure gas in the top of cylinder 2 gradually leaks into communicating chamber 7 and intermediate chamber 6 through a gap between the inner surface of cylinder 2 and the outer peripheral portions of piston 3. Thus, the pressure in cylinder 2 gradually decreases, and if it becomes less than the recoil strength of spring 4 and the pressure in intermediate pressure chamber 6, piston 3 is pushed upward. As a result of this upward movement of piston 3, the volume in the top of cylinder 2 decreases and the pressure in cylinder 2 increases. Therefore, piston 3 is urged downward again. However, since the compressed gas in the top of cylinder 2 continuously leaks into the communicating and intermediate chambers, piston 3 gradually moves up with vibrating motion. If vibration of the piston occurs continuously during operation, durability of the piston becomes a problem. Noise is also generated by the vibration of piston. Furthermore, stable operation of the variable displacement mechanism cannot be achieved when the piston vibrates within the cylinder.

Also, when piston 3 is urged downward and closes the opening of intermediate pressure chamber 6, the outer edge of piston 3 strikes against the inner bottom surface of cylinder 2 and causes impact noise. Also, piston 3 abrades due to the intermittent impact, adversely effecting the reliability of the control mechanism.

SUMMARY OF THE INVENTION

It is a primary object of the present invention to provide a scroll type compressor with a variable displacement mechanism with a stable control device.

It is another object of the present invention to provide a scroll type compressor with a variable displacement mechanism which has high durability.

It is still another object of the present invention to provide a scroll type compressor with a variable displacement mechanism which is controlled at lower noise levels.

A scroll type compressor according to the present invention includes a housing having an inlet port and an outlet port. A fixed scroll is fixedly disposed within the housing and has a circular end plate from which a first spiral element extends. An orbiting scroll has a circular end plate from which a second spiral element extends. The first and second spiral elements interfit at an angular and radial offset to make a plurality of line contacts to define at least one pair of fluid pockets within the interior of the housing. A driving mechanism is operatively connected to the orbiting scroll to effect the orbital motion of the orbiting scroll. A rotation preventing mechanism prevents the rotation of the orbiting scroll so that the volume of fluid pockets change during the orbital motion of the orbiting scroll. The circular end plate of fixed scroll divides the interior of the housing into a front chamber and a rear chamber, and a suction chamber of the front chamber communicates with the fluid inlet port. The rear chamber is divided into discharge chamber which communicates between a fluid outlet port and a central fluid pocket formed by both scrolls, and an intermediate pressure chamber. At least one pair of holes are formed through the circular end plate of the fixed scroll to form a fluid channel between the fluid pockets and the intermediate pressure chamber. A control device is disposed on a portion of the intermediate pressure chamber for controlling communication between the intermediate pressure chamber and the suction chamber, and includes a cylinder, a piston which is slidably disposed within the cylinder and a communicating mechanism which leaks fluid received in the cylinder from the discharge chamber to the suction chamber. The cylinder is connected with the intermediate pressure chamber, the suction chamber and the discharge chamber. The piston is reciprocated within the cylinder in accordance with a pressure difference between the pressure in the cylinder above the piston and the pressure in the intermediate pressure chamber. The cylinder is connected with the discharge chamber, and communication with the discharge chamber is controlled by a magnetic valve device. The communicating mechanism leaks the received fluid at an increased rate from the cylinder when the piston is moved upward a predetermined distance from its lowermost position.

Also, a scroll type compressor according to the present invention includes a housing having an inlet port and an outlet port. A fixed scroll is fixedly disposed within the housing and has a cylindrical end plate from which a first spiral element extends. An orbiting scroll has a circular end plate from which a second spiral element extends. The first and second spiral elements interfit at an angular and radial offset to make a plurality of line contacts to define at least one pair of fluid pockets within the interior of the housing. A driving mechanism is operatively connected to the orbiting scroll to effect the orbital motion of the orbiting scroll. A rotation preventing mechanism prevents the rotation of the orbiting scroll so that the volume of fluid pockets change during the orbital motion of the orbiting scroll. The circular end plate of fixed scroll divides the interior of the housing into a front chamber and a rear chamber, and a suction chamber of the front chamber communicates with the fluid inlet port. The rear chamber is divided into a discharge chamber, which communicates between the fluid outlet port and a central fluid pocket formed by both scrolls, and an intermediate pressure chamber. At least one pair of holes are formed through the circular end plate of fixed scroll to form a fluid channel between the fluid pockets and the intermediate pressure chamber. A control device is disposed on a portion of the intermediate pressure chamber for controlling communication between the intermediate pressure chamber and the suction chamber, and includes a cylinder, a piston which is slidably disposed within the cylinder and a shock absorbing element. The cylinder is connected with the intermediate pressure chamber, the suction chamber and the discharge chamber. The piston is reciprocated in accordance with a pressure difference between the pressure in the cylinder above the piston and the pressure in the intermediate pressure chamber. The shock absorbing element absorbs the impact force between an inner wall surface of the cylinder and piston, and secures sealing between the piston and the inner wall surface of the cylinder.

Further objects, features and aspects of this invention will be understood from the following detailed description of a preferred embodiments of this invention, referring to the annexed drawings.

DETAILED DESCRIPTION

Figure 2:
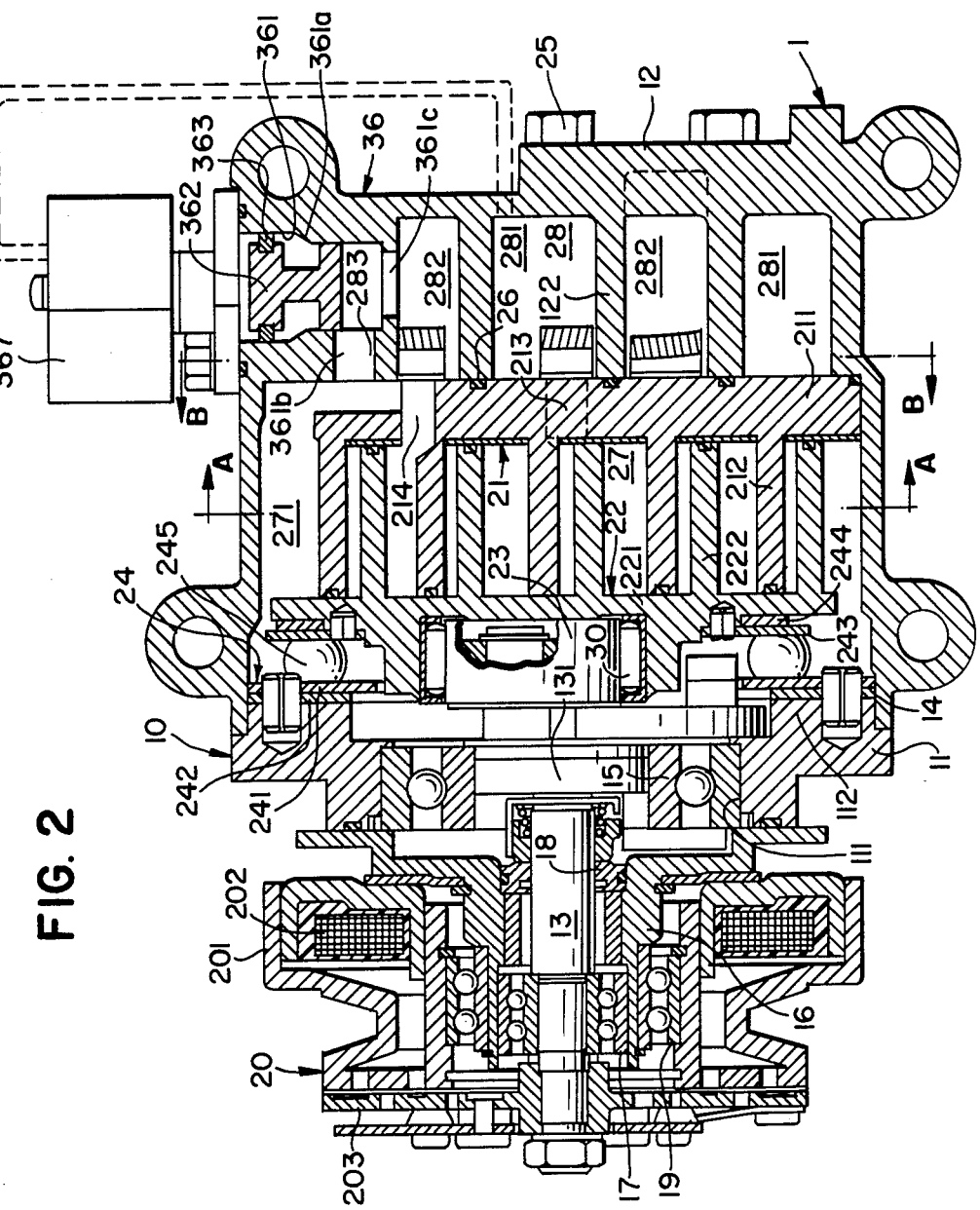
FIG. 2 is a cross-sectional view of a scroll type compressor in accordance with one embodiment of this invention.

Referring to FIG. 2, a scroll type compressor with a variable displacement mechanism in accordance with one embodiment of the present invention is shown. The scroll type compressor includes a compressor housing 10 having front end plate 11 and cup-shaped casing 12 which is attached to an end surface of end plate 11. Hole 111 is formed in the center of front end plate 11 for penetration of drive shaft 13, and supports an outer race of a bearing 15. Annular projection 112 is formed in a rear surface of front end plate 11. Annular projection 112 faces cup-shaped casing 12 and is concentric with hole 111. An outer peripheral surface of projection 112 extends into an inner wall of the opening of cup-shaped casing 12. Thus, opening 121 of cup-shaped casing 12 is covered by front end plate 11. O-ring 14 is placed between the outer peripheral surface of annular projection 112 and the inner wall of the opening of cup-shaped casing 12 to seal the mating surfaces of front end plate 11 and cup-shaped casing 12.

Figure 1:
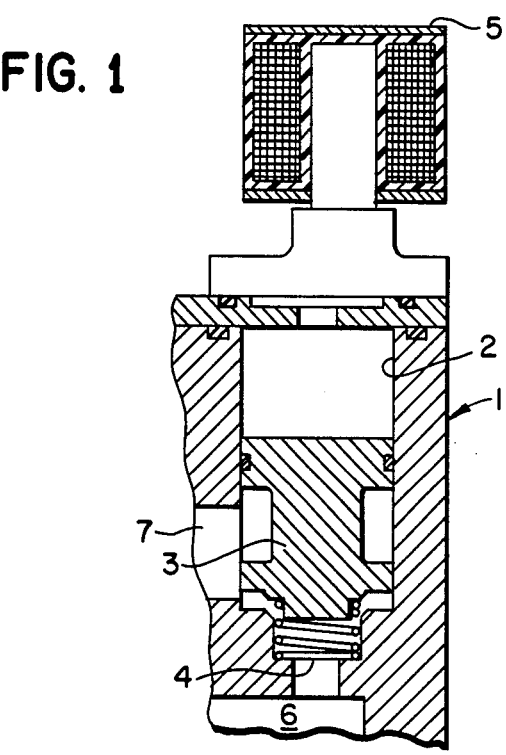
FIG. 1 is a cross-sectional view illustrating the control device of a variable displacement mechanism of a scroll type compressor as disclosed in U.S. application Ser. No. 875,561.

Annular sleeve 16 projects from the front end surface of front end plate 11 to surround drive shaft 13 and define a shaft seal cavity. In the embodiment shown in FIG. 1, sleeve 16 is formed separately from front end plate 11. Therefore, sleeve 16 is fixed to the front end surface of front end plate 11 by screws (not shown). Alternatively, sleeve 16 may be formed integral with front end plate 11.

Drive shaft 13 is rotatably supported by sleeve 16 through bearing 17 located within the front end of sleeve 16. Drive shaft 13 has disk-shaped rotor 131 at its inner end which is rotatably supported by front end plate 11 through bearing 15 located within opening of front end plate 11. Shaft seal assembly 18 is coupled to drive shaft 13 within the shaft seal cavity of sleeve 16.

Pulley 201 is rotatably supported by ball bearing 19 which is carried on the outer surface of sleeve 16. Electromagnetic coil 202 is fixed about the outer surface of sleeve 16 by a support plate. Armature plate 203 is elastically supported on the outer end of drive shaft 13. Pulley 201, magnetic coil 202 and armature plate 203 form a magnetic clutch 20. In operation, drive shaft 13 is driven by an external power source, for example, the engine of an automobile, through a rotation transmitting device such as the above explained magnetic clutch.

Fixed scroll 21, orbiting scroll 22, a driving mechanism for orbiting scroll and a rotation prevention/thrust bearing mechanism for orbiting scroll 22 are disposed in the interior of housing 10.

Fixed scroll 21 includes circular end plate 211 and spiral element 212 affixed to or extending from one end surface of circular end plate 211. Fixed scroll 21 is fixed within the inner chamber of cup-shaped casing 12 by screws 25 screwed into end plate 211 from outside of cup-shaped casing 12. Circular end plate 211 of fixed scroll 21 in cooperation with compressor housing 10 partitions the inner chamber of cup-shaped casing 12 into two chambers, such as front chamber 27 and rear chamber 28. Spiral element 212 is located within front chamber 27.

Partition wall 122 axially projects from the inner end surface of cup-shaped casing 12. The end surface of partition wall 122 contacts against the end surface of circular end plate 211. Thus, partition wall 122 divides rear chamber 28 into discharge chamber 281 formed at center portion of the rear chamber 28 and intermediate pressure chamber 282. O-ring 26 may be disposed between the end surface of partition wall 122 and end plate 211 to secure the sealing.

Orbiting scroll 22, which is located in front chamber 27, includes a spiral element 222 affixed to or extending from one end surface of circular end plate 221. Spiral element 222 of orbiting scroll 22 and spiral element 212 of fixed scroll 21 interfit at angular offset of 180° and a predetermined radial offset. Sealed spaces are thus formed between both spiral elements 212 and 222. Orbiting scroll 22 is rotatably supported by eccentric busing 23, which is connected with the inner end of disc-shaped portion 131 at the eccentricity of the axis of drive shaft 13, through radial needle bearing 30.

While orbiting scroll 22 orbits, the rotation of orbiting scroll 22 is prevented by rotation preventing/thrust bearing mechanism 24 which is placed between the inner end surface of front end plate 11 and circular end plate 221 of orbiting scroll 22. Rotation preventing/thrust bearing mechanism 24 includes fixed ring 241, fixed race 242, orbiting ring 243, orbiting race 244 and balls 245. Fixed ring 241 is attached on the inner end surface of front end plate 11 through fixed race 242 and has a plurality of circular holes (not shown). Orbiting ring 243 is attached on the rear end surface of orbiting scroll 22 through orbiting race 244 and has a plurality of circular holes (not shown). Each ball 245 is placed between a hole of fixed ring 242 and a hole of orbiting ring 243, and moves along the edges of both circular holes. Also, axial thrust load from orbiting scroll 22 is supported on front end plate 11 through balls 245.

Compressor housing 10 is provided with inlet port (not shown) and an outlet port (not shown) for connecting the compressor to an external refrigerating circuit. Refrigerant gas from the external circuit is introduced into a suction chamber 271 of front chamber 27 through the an inlet port and is taken into sealed spaces which are formed between both spiral elements 212 and 222, through open spaces between the spiral elements. The shape of the openings is formed by the outer terminal end of one spiral element and the outer side surface of the other spiral element, respectively. The openings sequentially open and close during the orbital motion of orbiting scroll 22. When the opening is open, fluid to be compressed is taken into these spaces but no compression occurs, and when the opening is closed, thereby sealing off the spaces, no additional fluid is taken into the spaces and compression begins. Since the location of the outer terminal ends of each spiral elements 212 and 222 is at the final involute angle, location of the openings is directly related to the final involute angle $\phi$ end. Furthermore, refrigerant gas in the sealed space is moved radially inward and compressed in accordance with the orbital motion of orbiting scroll 22. Compressed refrigerant gas at the center sealed space is discharged to discharge chamber 281 through discharge port 213, which is formed at the center portion of circular end plate 211.

Figure 3A:
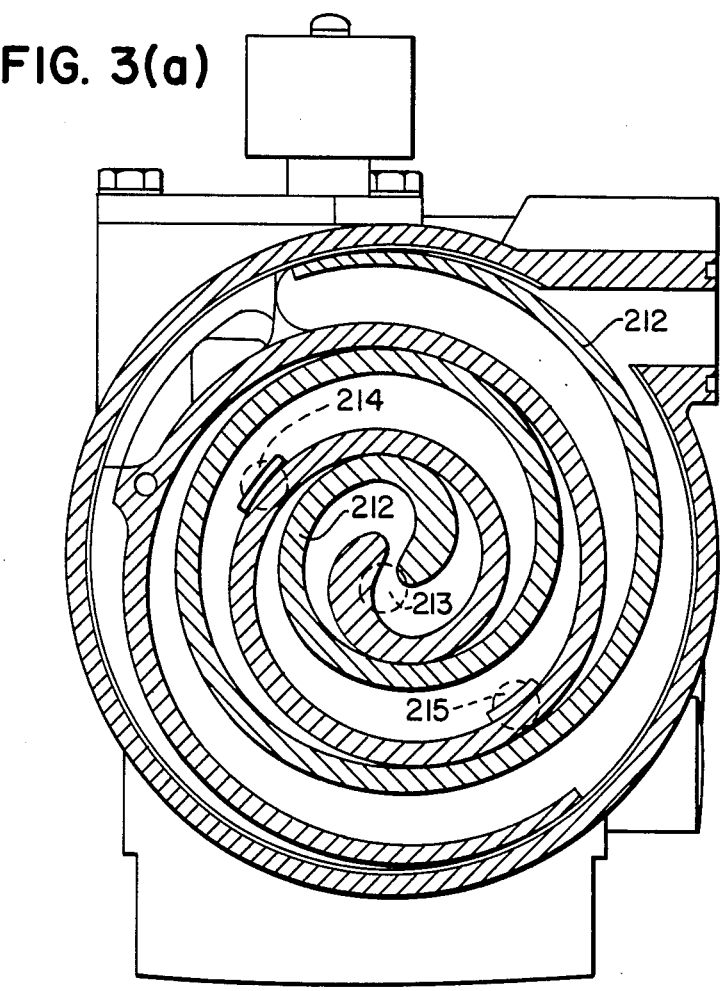
FIG. 3(a) is a cross-sectional view taken along line A—A of FIG. 2.
Figure 3B:
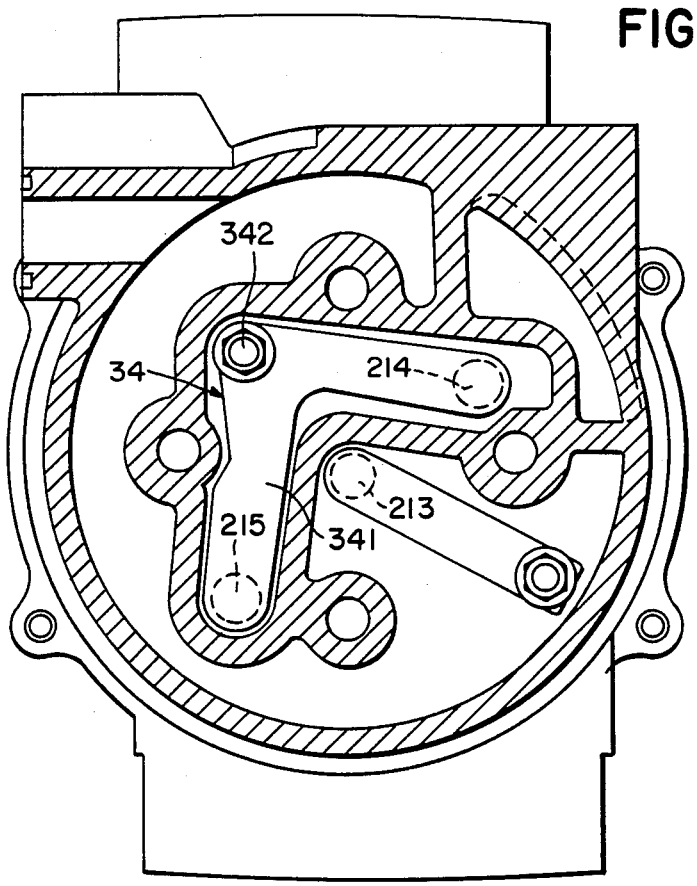
FIG. 3(b) is a cross-sectional view taken along the line B—B of FIG. 2.

Referring to FIGS. 3(a) and 3(b), a pair of holes 214, 215 are formed in end plate 211 of fixed scroll 21 and are placed at symmetrical positions so that an axial end surface of spiral element 222 of orbiting scroll 22 simultaneously crosses over holes 214, 215. Holes 214, 215 communicate between the sealed space and intermediate pressure chamber 282. Hole 215 is placed at a position defined by involute angle $\phi$, and opens along the inner side wall of spiral element 212. The other hole 214 is placed at a position defined by involute angle $(\phi - \pi)$ and opens along the outer side wall of spiral element 212. Holes 214, 215 are located in an intermediate pressure area of compression between the spiral wrap elements. A control device, such as valve member 34 having valve plate 341 is attached by fastening device 342 to the end surface of end plate 211 and extends over each hole 214, 215. Valve plate 341 is made of a spring type material so that the recoil strength of valve plate 341 pushes itself against the opening of respective holes 214, 215 to close each hole.

Figure 5:
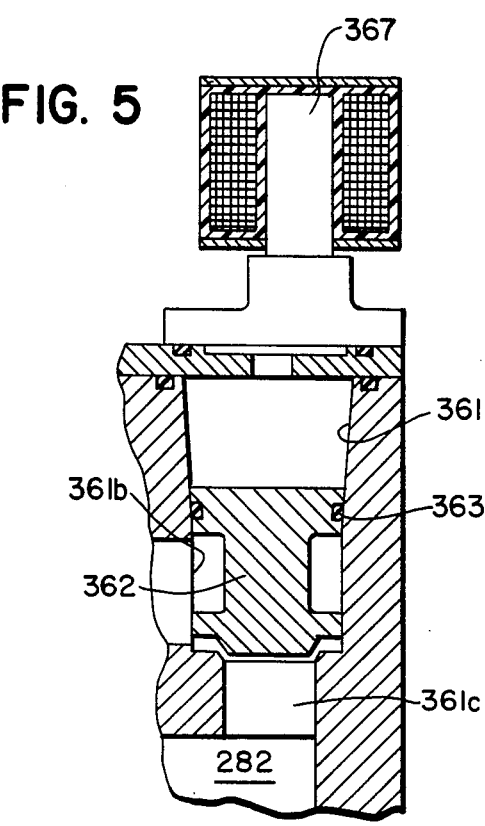
FIG. 5 is a cross-sectional view of a variable displacement control mechanism modified from the control mechanism shown in FIG. 2.

A control mechanism 36, which controls communication between suction chamber 271 and intermediate chamber 282, includes a cylinder 361, an inner surface of I-shaped piston 362 slidably disposed within cylinder 361 and piston ring 363. Cylinder 361 includes a first cylinder portion, a second cylinder portion which is located below first cylinder portion and has a smaller internal diameter than first cylinder portion, and a tapershaped step portion 361a which connects the inner surface of first cylinder portion with the inner surface second cylinder portion. The inner surface of the first cylinder portion is formed as an annular surface. Alternatively, the inner surface of first cylinder portion can be formed as slant or tapered surface to enlarge the diameter from the lower portion to the upper portion, as shown in FIG. 5.

Figure 4:
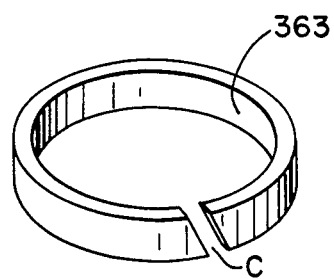
FIG. 4 is a perspective view of a piston ring which is used in the variable displacement mechanism shown in FIG. 2.

A first opening 361b is formed on the side surface of cylinder 361 to connect with suction chamber 271, and a second opening 361c is formed on the bottom portion of cylinder 361 to connect with intermediate pressure chamber 282. A channel 283 is formed as a continuation of first opening 361b. The upper portion of cylinder 361, above piston 362, is connected with discharge chamber 281 through a capillary tube, shown diagrammatically in dashline in FIG. 2. The communication between cylinder 361 and discharge chamber 281 may be controlled by electromagnetic valve 367 disposed on housing 10. Piston ring 363 is loosely fitted in a groove formed on the upper portion of piston 362 and has a cut out portion C along its periphery, as shown in FIG. 4. When piston ring 363 is in the first cylinder portion, cut out portion C of piston ring 363 is expanded by the recoil strength of the ring. Also, since the diameter of the second cylinder portion is less than that of the first cylinder portion, if piston ring 363 is in the second cylinder portion, piston ring 363 is forced to become small so that cut out portion C also becomes small.

The operation of control mechanism 36 will now be described. When orbiting scroll 22 is operated by the rotation of drive shaft 13, refrigerant gas which is taken into sealed spaces defined between both spiral elements 212 and 222 moves toward the center of both spiral elements 212 and 222 with a resultant volume reduction and compression, and is discharged from discharge port 213 to discharge chamber 281.

In this condition, when electromagnetic valve 367 is energized, compressed gas (fluid) in discharge chamber 281 is introduced into cylinder 361 above piston 362 through the capillary tube, the pressure in the first cylinder portion becomes higher than that in the second cylinder portion which is connected with intermediate pressure chamber 282, and piston 362 is urged downward by the pressure force of compressed gas in the first cylinder portion. In this situation, second hole 361c which connects cylinder 361 with intermediate pressure chamber 282 is covered by piston 362, and communication between suction chamber 271 and intermediate pressure chamber 282 is prevented. Therefore, pressure in intermediate pressure chamber 282 gradually increases due to leakage gas from the fluid pockets through holes 214 and 215. This leakage of compressed gas continues until the pressure in intermediate pressure chamber 282 is equal to the pressure in the fluid pockets. When pressure equalization occurs, holes 214, 215 are closed by the spring tension of valve plate 341 so that the compression cycle operates normally and the displacement volume of the sealed off fluid pockets is maximized. When second opening 361c is closed by piston 362, control mechanism 36 is formed so that the upper end portion of piston 362 is located on the second cylinder portion at position below taper-shaped step portion 361a of cylinder 361 (FIG. 2 embodiment) or below the taper of the first cylinder portion (FIG. 5 embodiment). Therefore, leakage of the compressed fluid in the first cylindrical portion is restricted.

On the other hand, if electromagnetic valve 367 is de-energized, communication between discharge chamber 281 and cylinder 361 is prevented. Since the upper end portion of piston 362 is within the smaller second cylinder portion and piston ring 363 which is disposed on the outer peripheral of the upper end portion 362 has a small gap, compressed gas leaks from the first cylinder portion to the second cylinder portion gradually, and the pressure in the first cylinder portion gradually decreases. When the pressure in cylinder 361 above piston 362 is lower than that in intermediate pressure chamber 282, piston 362 is pushed upward by the pressure force of refrigerant gas in intermediate pressure chamber 282. At the time when the upper end portion of piston 352 moves upward toward the first cylinder portion a predetermined distance to cross over taper-shaped step portion 361a (FIG. 2), the force which pressed piston ring 363 radially is removed, and the cut out portion C of piston ring 363 expands. Thus, compressed gas (fluid) in cylinder 361 flows out through the enlarged gap of piston ring 363 at an increased rate. As a result of this leakage of compressed gas, piston 362 is urged upward rapidly, and intermediate pressure chamber 282 communicates with suction chamber 271. The pressure in intermediate pressure chamber 282 is decreased, valve plate 341 opens holes 214, 215, so that compressed gas flows into intermediate pressure chamber 282 from the fluid pockets through each hole 214, 215 and into communication chamber 283 through cylinder 361. Therefore, the volume of compressed gas which is discharged from the sealed off spaces between scroll elements 112, 222 into discharge chamber 281 is decreased, and the compression ratio is decreased.

Figure 6:
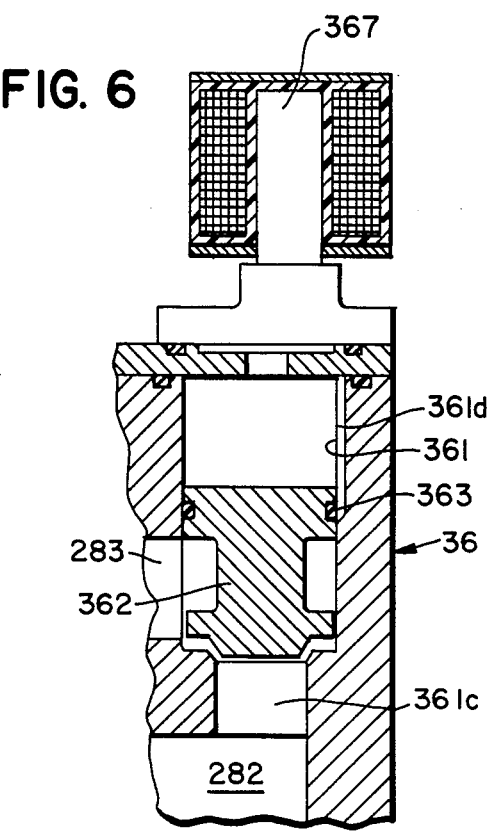
FIG. 6 is a cross-sectional view of another modified variable displacement control mechanism for use in a scroll type compressor as shown in FIG. 2.
Figure 7:
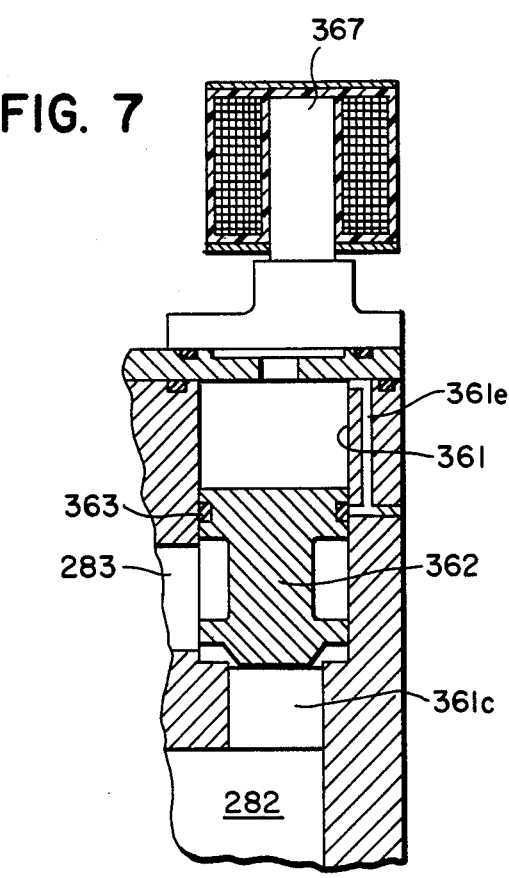
FIG. 7 is a cross-sectional view of a variable displacement control mechanism modified from the control mechanism shown in FIG. 6.

Referring to FIG. 6, a second embodiment of a control mechanism in accordance with this invention is shown. In this embodiment, groove 361d extends on the inner surface of cylinder 361 from the upper end portion of cylinder 361 to a predetermined position. Groove 361d could be replaced by a communication passageway 361e formed through the wall of cylinder 361, as shown in FIG. 7. Passageway 361e has an upper opening adjacent the top of cylinder and a lower opening slightly above the middle of the cylinder. When second opening 361c is closed by piston 362, control mechanism 36 is formed so that upper end portion of piston 362 and piston ring 363 are located at a position slightly lower than the bottom end portion of groove 361d or the lower opening to communication passageway 361e. Piston ring 363 may or may not include gap C. If electromagnetic valve 367 is de-energized, communication between cylinder 361 above piston 362 and discharge chamber 281 is prevented. At this time, compressed gas in cylinder 361 above piston 362 leaks gradually through the small gap of piston ring 363 or around piston ring 363, and when the pressure in cylinder 361 is lower than that in intermediate pressure chamber 282, piston 362 moves up slightly. When piston 362 moves up slightly, a gap is formed between the outer peripheral surface of piston 362 and groove 361d, and compressed gas in cylinder 361 flows at an increased rate into suction chamber 271 through groove 361d (FIG. 6) or through communication passageway 361e (FIG. 7). As a result of this leakage of compressed gas in cylinder 361, the pressure in cylinder 361 above piston 362 decreases a large degree, and piston 362 moves up rapidly.

Figure 8:
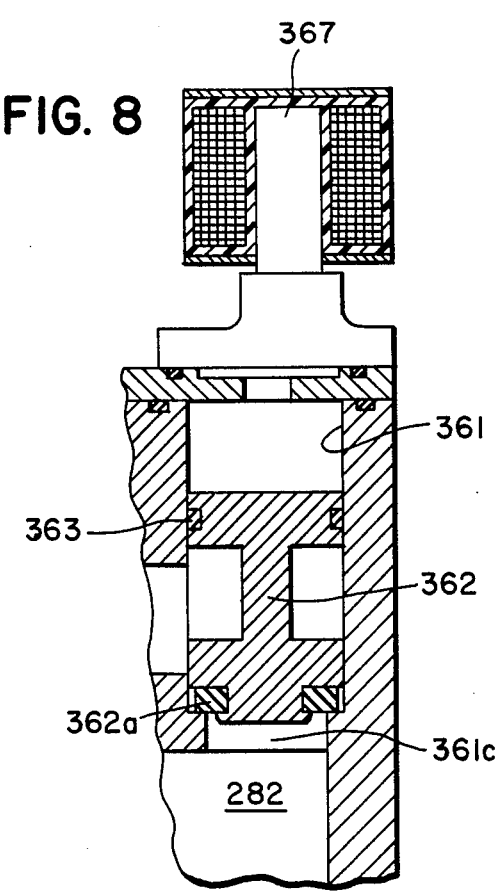
FIG. 8 is a cross-sectional view of another variable displacement control mechanism for use in a scroll type compressor as shown in FIG. 2.

Referring to FIG. 8, a third embodiment of a control mechanism in accordance with this invention is shown. A shock absorber 362a in the form of an annular ring is attached to the bottom end portion of piston 362. If electromagnetic valve 367 is energized, compressed gas flows into cylinder 361 from discharge chamber 281. Since compressed gas is at a much higher pressure than the pressure in intermediate pressure chamber 282, piston 362 is quickly pushed downward to close second opening 361c. Shock absorber 362a under the bottom end portion of piston 362 absorbs the impact force between second opening 361c and piston 362, and also secures sealing between intermediate chamber 282 and cylinder 361.

Figure 9:
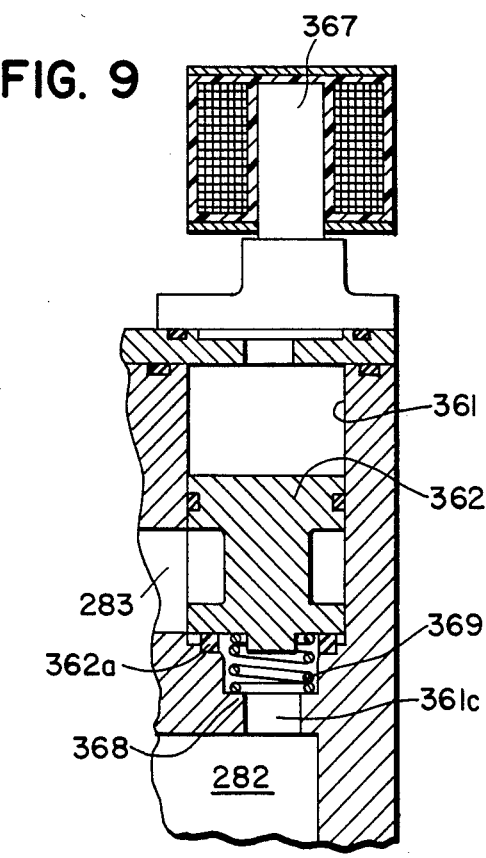
FIG. 9 is a cross-sectional view of a variable displacement control mechanism modified from the mechanism shown in FIG. 8.

Referring to FIG. 9, a modification of the control mechanism shown in FIG. 8 is disclosed. Shock absorber 362a is disposed around the bottom end portion of cylinder 361. A step portion 368 is formed around second opening 361c. A spring 369 is disposed between step portion 368 and piston 362 to urge the piston upward. If electromagnetic valve 367 is energized, compressed gas flows into cylinder 361 from discharge chamber 281, and piston 362 is urged downward against the recoil strength of spring 369 and the gas pressure in intermediate pressure chamber 282. Hard contact between the piston and cylinder is prevented because the downward movement of piston 362 is restricted by the recoil strength of spring 369 and because contact against shock absorber 362a is provided on the bottom end portion of cylinder 361.

Figure 10:
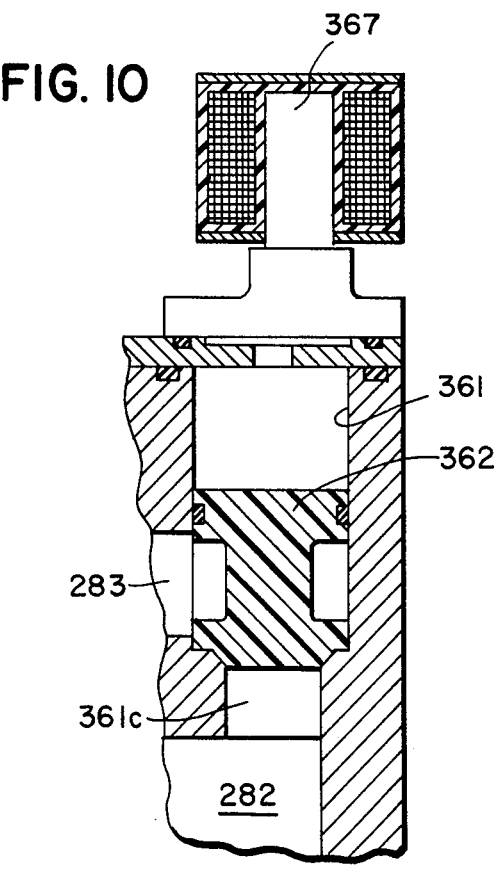
FIG. 10 is a cross-sectional view of another variable displacement control mechanism for use in a scroll type compressor as shown in FIG. 2.

Referring to FIG. 10, a further embodiment of a control mechanism in accordance with this invention is shown. Piston 362 is made of resinous material having the characteristics of self-lubrication, and friction-proof, e.g., polytetrafluoroethylene. Since piston 362 is made of resinous material, even if piston 362 hits hard against the bottom end portion of cylinder 361, the shock is absorbed and noise is not generated. Also, since piston 362 has the characteristic of self-lubrication, piston 362 can smoothly reciprocate within the cylinder.

This invention has been described in detail in connection with preferred embodiments, but these are for example only and this invention is not restricted thereto. It will be easily understood by those skilled in the art that variations and modifications can be easily made without departing from the scope of this invention.

We claim:

1. A scroll type compressor including a housing having an inlet port and outlet port, a fixed scroll fixedly disposed within said housing and having a circular end plate from which a first spiral element extends into the interior of said housing, an orbiting scroll having a circular end plate from which a second spiral element extends, said first and second spiral elements interfitting at an angular and radial offset to make a plurality of line contacts to define at least one pair of fluid pockets within the interior of said housing, a driving mechanism operatively connected to said orbiting scroll to effect the orbital motion of said orbiting scroll, a rotation preventing mechanism for preventing the rotation of said orbiting scroll during the orbital motion to thereby change the volume of fluid pockets, said circular end plate of said fixed scroll dividing the interior of said housing into a front chamber and a rear chamber, said front chamber including a suction chamber communicating with said inlet port, and said rear chamber being divided into a discharge chamber which communicates between said outlet port and a central fluid pocket formed by both said scrolls and an intermediate pressure chamber, at least one pair of holes formed through said circular end plate of said fixed scroll to form a fluid channel between the fluid pockets and said intermediate pressure chamber, a cylinder connected for fluid communication with said intermediate pressure chamber, said suction chamber and said discharge chamber means for selectively passing fluid from said discharge chamber to said cylinder, and control means for controlling communication between said intermediate pressure chamber and said suction chamber through said cylinder, said control means comprising a piston slidably disposed within said cylinder and communicating means for leaking fluid received in said cylinder from said discharge chamber to said suction chamber, said piston sliding within said cylinder in accordance with a pressure difference between the pressure in said cylinder above said piston and the pressure in said intermediate pressure chamber, and said communicating means leaking the received fluid at an increased rate from said cylinder when said piston pushed upward a predermined distance from a lowermost position.

2. The scroll type compressor of claim 1 wherein said communicating means comprises a piston ring which is provided with cut-out portion and is loosely fitted in a groove formed on an upper portion of said piston, and said cylinder includes a first cylinder portion and a second cylinder portion and both said portions being connected by a step portion, a diameter of said first cylinder portion being greater than that of said second cylinder portion.

3. The scroll type compressor of claim 1 wherein said communicating means comprises a piston ring which is provided with a cut-out portion and is loosely fitted in a groove formed on an upper portion of said cylinder and said cylinder includes a first cylinder portion and a second cylinder portion, said first cylinder portion being formed as taper-shaped surface with a diameter decreasing from its upper to its lower end and a diameter of said second cylinder portion being less than the decreasing diameter of said first cylinder portion.

4. The scroll type compressor of claim 1 wherein said communicating means comprises a groove formed on an inner wall surface of said cylinder and extending to a predetermined distance above the lowermost end of said cylinder.

5. The scroll type compressor of claim 1 wherein said communicating means comprises passageway formed in a wall of said cylinder, said passageway including first and second openings, said first opening of said passageway being positioned on the inner surface of said cylinder to place the upper end of said piston slightly below said first opening when said piston is in its lowermost position to prevent communication between said cylinder and said suction chamber and said second opening of said passageway opening at the upper end portion of said cylinder.

* * * * *